United States Patent [19]

Robbins et al.

[11] Patent Number: 4,957,219

[45] Date of Patent: Sep. 18, 1990

[54] MEASURING AND DISPENSING CAP

[76] Inventors: E. Stanley Robbins, P.O. Box 174, Killen, Ala. 35645; Rodney W. Robbins, 207 Cherokee Rd., Nashville, Tenn. 37205

[21] Appl. No.: 304,122

[22] Filed: Jan. 31, 1989

[51] Int. Cl.⁵ .............................................. G01F 11/20
[52] U.S. Cl. ........................................ 222/39; 222/368
[58] Field of Search ....................... 222/348, 367–368, 222/23, 39, 48, 181

[56] References Cited

U.S. PATENT DOCUMENTS

| 2,518,520 | 8/1950 | Broun | 222/368 |
| 2,575,967 | 11/1951 | May | 222/368 X |
| 2,710,118 | 6/1955 | Stoddard | 222/266 |
| 2,740,562 | 4/1956 | Bello | 222/410 |
| 3,018,924 | 1/1962 | Reed | 222/48 |
| 3,122,278 | 2/1964 | Crozier | 222/305 |
| 3,130,874 | 4/1964 | Bulmer | 222/142.8 |
| 4,071,171 | 1/1978 | Bassignani | 222/305 |
| 4,162,751 | 7/1979 | Hetland et al. | 222/293 |
| 4,580,704 | 4/1986 | Escue | 222/367 |
| 4,674,660 | 6/1987 | Botto | 222/181 |

FOREIGN PATENT DOCUMENTS

| 371447 | 5/1939 | Italy | 222/367 |
| 251430 | 8/1948 | Switzerland | 222/368 |

Primary Examiner—Michael S. Huppert
Attorney, Agent, or Firm—Phillips & Beumer

[57] ABSTRACT

A metering and dispensing cap for use with material containers such as spice jars is disclosed. The cap has a housing that extends horizontally across the mouth of the jar and provides a rectangular outer aperture spaced apart from an aperture that communicates with the interior of the jar. A metering rotor having a plurality of compartments of equal volume spaced around its circumference is provided in the housing between the two apertures. Upon turning the rotor, the compartments are sequentially filled by exposure to the contents of an inverted jar and emptied when aligned with the external aperture. The compartments are defined by axially extending, spaced-apart blades on the rotor. Wiping action to obtain precise metering is obtained by movement of the blades past a curved surface of the housing in slight spaced-apart relation. Amounts of dispensed material are obtainable in multiples of the amount contained in one compartment. A detent mechanism enables control and sensing of the amount dispensed.

7 Claims, 3 Drawing Sheets

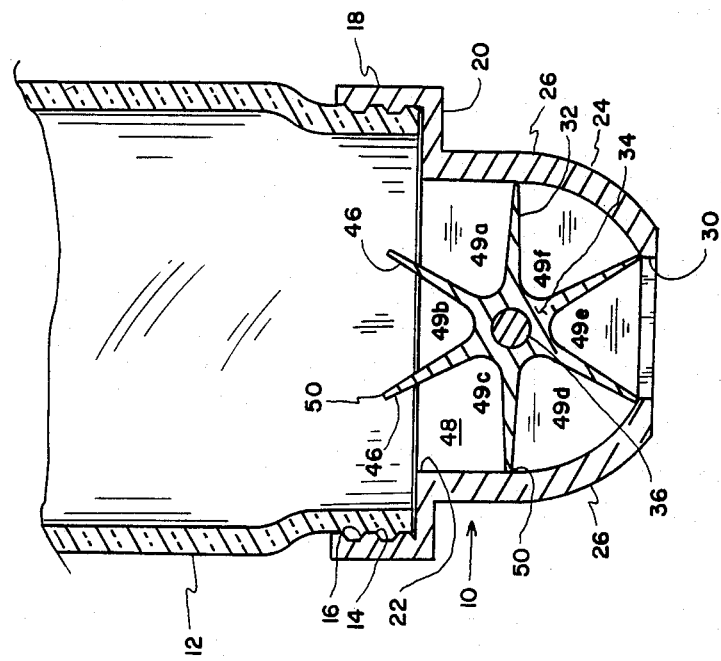
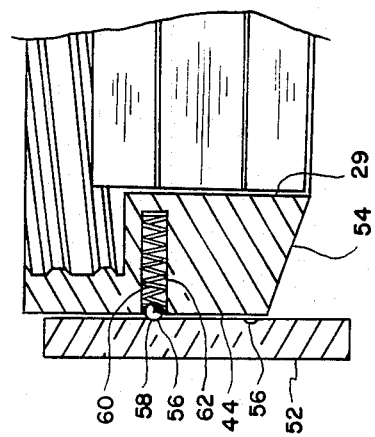
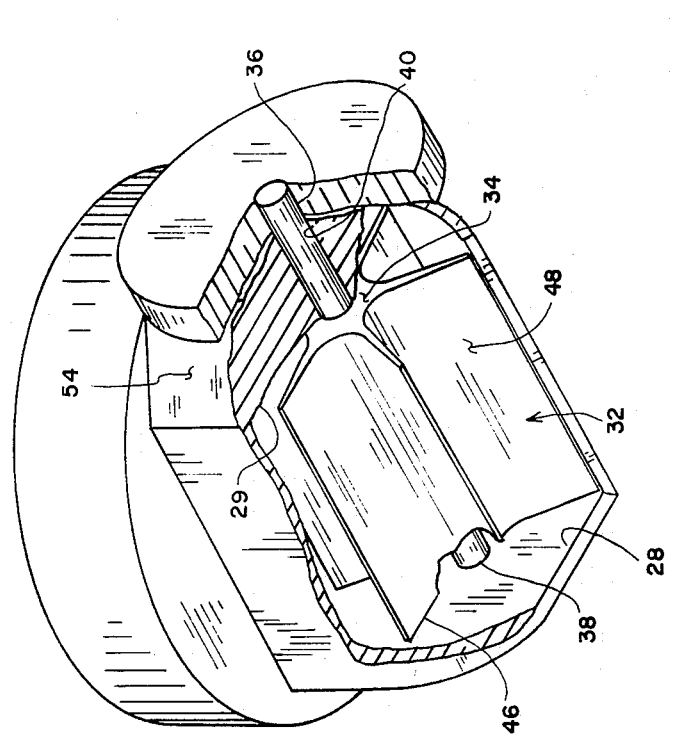

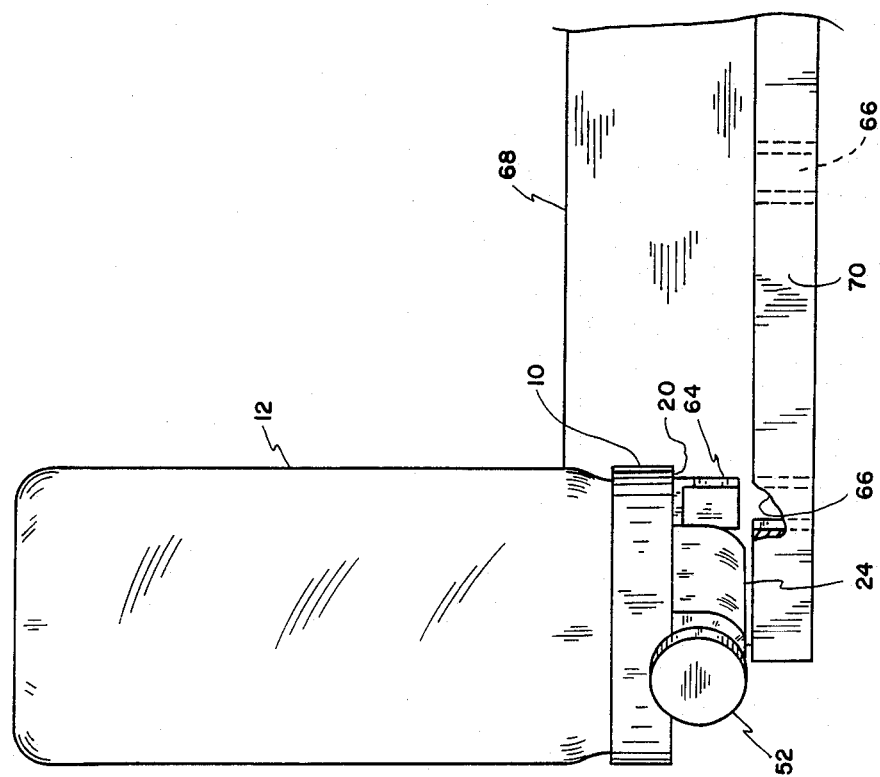

MEASURING AND DISPENSING CAP

FIELD OF THE INVENTION

This invention relates generally to devices for dispensing particulate material and more particularly to measuring and dispensing caps for use with material containers.

BACKGROUND OF THE INVENTION

A need exists for an improved means of dispensing particulate food products or ingredients from their containers. Many spices, for example, are commonly supplied in jars with screw-on caps. In the absence of a dispensing feature on the cap, it must be unscrewed and removed to enable insertion of a measuring spoon for removal of the amount desired. This procedure is inconvenient, particularly where several spices are required for use in a given recipe, and it is difficult to level off the contents of the spoon in a precise manner without spilling some of the contents. These problems can be avoided by use of a cap that has a built-in metering and dispensing rotor disposed across the mouth of the jar. Such a dispensing cap may be operated by holding the jar upside down and turning the rotor, whereby the quantity that fills the cavity in the rotor is dispensed downward by gravity when the cavity is aligned with an external aperture.

Various types of dispensing devices, including metering dispenser caps, are disclosed in prior art patents. U.S. Pat. No. 4,162,751, issued July 31, 1979, to Hetland et al., discloses a dispenser cap including a housing defining a vertically extending discharge spout and having an inlet opening and an outlet opening with a rotor disposed across the spout between the openings. The rotor has a single, axially disposed chamber that is movable from a loading position to a dispensing position upon rotation. The chamber in this device is adjustable in volume by means of a rack-and-pinion actuated member that varies the location of the chamber bottom or by means of movable segments making up the sides of the chamber. U.S. Pat. No. 3,122,278, issued Feb. 25, 1964, to Crozier, also discloses a dispenser with a metering rotor disposed across the opening of a dispensing spout, the rotor having only one measured cavity that is adjustable by insertion or removal of reducer elements. Other approaches are shown by U.S. Pat. Nos. 4,674,660, issued June 23, 1987, to Botto; 4,071,171, issued Jan. 31, 1978, to Bassignani; 3,130,874, issued Apr. 28, 1964, to Bulmer; 3,018,924, issued Jan. 30, 1962, to Reed; and 2,710,118, issued June 7, 1955, to Stoddard. These patents do not disclose a dispenser having a metering rotor disposed on an axis across the mouth or spout of a container but rather make use of elements that are movable on the same axis as the mouth of the container or employ plungers and tabs to actuate compartments of varying sizes. A dispenser that has a horizontal mounted shaft provided with spaced-apart blades operating on a shaft spanning a dispenser opening is shown in U.S. Pat. No. 2,740,562, issued Apr. 3, 1956, to Bello. This patent, however, is not concerned with dispensing a measured volume but with agitating the material being dispensed, and the rotary valve moves only within limits defined by stop pins.

To obtain maximum convenience, a dispenser cap for spices and other particulate food products should provide for delivery of precisely measured amounts directly into a mixing bowl or the like merely by the simple act of turning a knob, without requiring any adjustment to the dispenser mechanism for different amounts.

SUMMARY OF THE INVENTION

The present invention is directed to a dispenser cap for engagement with the mouth of a container of particulate material, the cap including a housing having secured therein a metering rotor located on an axis perpendicular to the mouth of the container. The rotor has axially extending compartments of equal volume spaced around its circumference and located such that, upon rotation, each compartment will be sequentially in communication with the interior of the container for being filled and with an exterior aperture for dispensing. The housing provides wiping action to precisely level of the filled compartments while they are being moved toward the dispensing aperture. Variations in the amount of material dispensed are obtainable in multiples of the amount delivered by one compartment. For example, the volume of each compartment could be one-fourth teaspoon, in which case a teaspoonful would be dispensed upon turning the rotor unit until four compartments reach the exterior aperture. Grasping means such as a knob is provided for turning the rotor. In order to enable the user to sense the number of compartments that are being engaged for dispensing, an indicator such as a spring-biased detent mechanism giving a clicking effect may be placed in operating relationship to the knob.

Dispenser caps embodying the invention may be placed in a plurality of containers as might be involved in a collection of a wide variety of spices. Each container with its own dispenser cap would then be supported upside down or on a rack or the like, allowing a chef to conveniently obtain a measured desired amount of any of the spices. No adjustment of compartment volumes is required in use of this dispenser, with larger amounts being obtainable in measured increments upon further rotation until the container contents are exhausted.

It is, therefore, an object of this invention to provide a dispenser cap for a particulate material container that enables dispensing of a precisely measured amount of material.

Another object is to provide such a dispenser cap that enables dispensing of variable amounts of material in multiples of a single measured amount.

Other objects and advantages of the invention will be apparent from the following detailed description and claims appended hereto.

BRIEF DESCRIPTION OF THE DRAWINGS

FIG. 2 is a sectional view taken along line 2—2 of FIG. 1.

FIG. 3 is a sectional view taken along line 3—3 of FIG. 1.

FIG. 4 is a partially cut-away view showing a rotor mechanism embodying the invention.

FIG. 5 is a pictorial view showing a dispenser cap and attached jar mounted on a supporting rack.

DESCRIPTION OF THE PREFERRED EMBODIMENT

Figure 1:
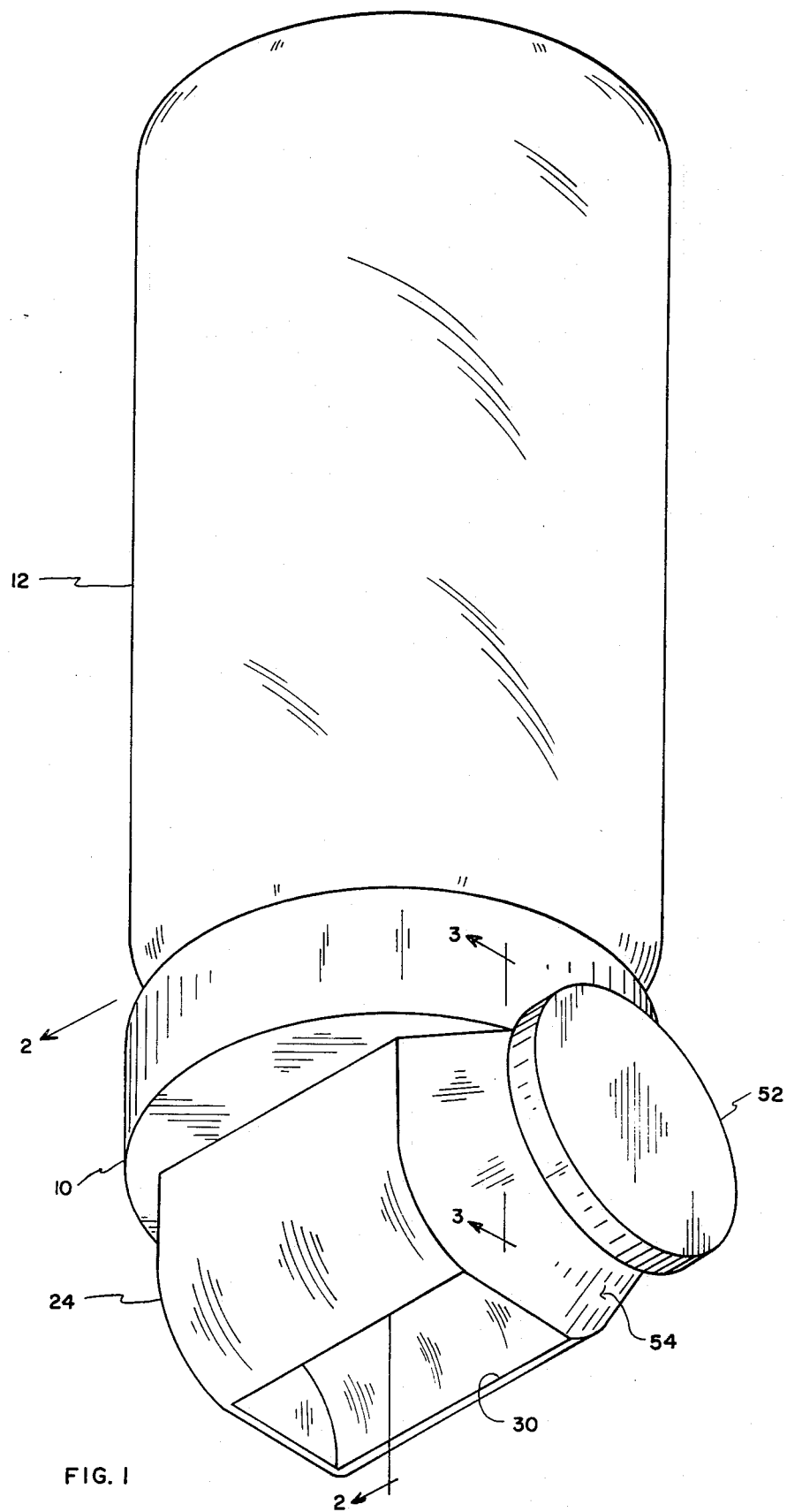
FIG. 1 is a pictorial view of a dispenser cap shown mounted in operating position on a spice jar.

Referring to FIGS. 1 and 2, there is shown a dispensing cap 10 attached to a spice jar 12 by engagement of inside threads 14 on the cap with outside threads 16 at the top of the jar. The assembled jar and cap are shown in upside-down operating position, enabling material in the jar to be fed downward by gravity. The cap includes a tubular side portion 18 integral with a flat end portion 20 that has a rectangular aperture 22 communicating with the interior of the jar. An outwardly extending housing 24 is connected to the cap end portion 20 around the sides of aperture 22. The housing has truncated tubular portions 26 defining its sides and flat end portions 28, 29 integral therewith. The end and side portions terminate in a plane parallel to the plane of the cap end portion 20 and define a rectangular external aperture 30.

A measuring and dispensing rotor 32 is disposed within the housing with its axis perpendicular to and across the mouth of the jar, operating between inner aperture 22 and outer aperture 30. Rotor 32 has an axially extending annular body 34 that receives and is secured to a shaft 36. The shaft at one end is journalled for rotation in circular hole 38 in end portion 28, and the other end is journalled in hole 40 through end wall 29 of tapered end region 54. The annular rotor body 34 has integral therewith a plurality of radially extending, spaced-apart blades 46 defining therebetween a plurality of compartments or cavities 48, each having the same volume as the others. Each of the blades has an outer edge 50 which fits in closely spaced-apart relation against the inside of tubular side portion 26 upon being rotated, thus providing wiping action to level off and slightly and reproducibly compress the material contained in the cavities so as to ensure that each cavity delivers the same amount. Knob 52 is secured to the outward extending end of shaft 36, enabling manual rotation of the rotor. The housing end adjacent the knob has an inwardly tapered region 54 between wall 29 and end 44, enabling the knob to be readily grasped.

As shown in FIG. 3, the inside face of knob 52 is provided with indentations 56 of semi-circular cross section, one for each blade, and with a ball 58 biased against that face by means of a spring 60 disposed in an axially extending hole 62 in the housing end adjacent the knob, thus providing a detent mechanism for sensing and controlling the extent of rotation. A distinct change in the amount of force required to turn the knob is produced as each indentation is reached so that the user may readily ascertain the number of compartments which have delivered the material being dispensed.

In operation of the dispenser cap as may be seen by reference to FIG. 2, cavities 48 are successively filled and emptied when the rotor is turned. Upon movement of the rotor, counterclockwise in this view, cavities 48 would become filled with material when they are moved from the position shown at 49a to the position as indicated by 49b. Upon further rotation to the 49c position, wiping action of the blade against the tubular portion of the housing levels off the material to provide a predetermined volume at the 49d position. Upon reaching the lowermost position at 49e, the cavity is aligned with aperture 30, and the material is dispensed downward. The cavity remains empty at position 49f. The rotor is constructed so as to provide each of the cavities with an equal volume; thus, the total amount of material dispensed may be determined by the number of cavities rotated to the dispensing position as described above. For example, each cavity could be provided with a volume of one-fourth teaspoon, in which case a full level teaspoonful would be obtained by turning the rotor to dispense material from four cavities.

FIG. 5 shows an arrangement whereby a plurality of jars with dispensing caps attached may be supported for convenient access. In this embodiment, a strip of material 68 which may be made of metal and which has a slightly protruding lip 70 at its bottom edge is mountable to the surface of a wall or cabinet. The lip has a series of spaced-apart vertically extending slots 66 into which tabs 64 connected to end portions 20 of the caps 10 may be inserted, holding the caps in position for storage as well as use. An array of jars providing a variety of spices or other products is thus made available for convenient use by merely turning the knob for the material desired.

The dispensing cap described above can be used for any solid particulate material that is flowable by gravity through the apparatus. In addition to spices, products such as instant coffee, granulated sugar, coffee creamer, or the like may be dispensed by this means.

Dispensing caps embodying the invention may be constructed of metal, but they are also amenable to use of plastics which would enable production in quantity at low cost.

While the invention has been described in terms of a specific embodiment, it is not to be understood as limited to such embodiment but is limited only in accordance with the appended claims.

We claim:

1. A metering and dispensing cap apparatus attachable across the mouth of a container comprising:

a cap body arranged to be removably secured to said container and disposed horizontally when said container is in an inverted, vertically disposed position;

said cap having an aperture communicating with the interior of said jar;

an integrally formed housing mounted on the outside of said cap body enclosing said aperture and having a pair of opposed, outwardly extending end portions and inwardly curved side portions terminating in an outer rectangular aperture spaced apart from said aperture of said cap body, said housing including in each end portion a circular, shaft-receiving aperture, one of said end portions having an inner face and an outer face, said outer face having defined therein an axially disposed, spring-receiving hole;

a metering rotor disposed in said housing between said apertures with its axis perpendicular to said container mouth;

said rotor having defined therein a plurality of circumferentially spaced-apart cavities of equal volumes and a central, circular opening extending axially therethrough;

a shaft extending axially through said opening in said rotor and engaging said shaft-receiving aperture;

a knob mounted on said shaft for turning said rotor, whereby said cavities may be sequentially filled with material in said container upon being in communication with the interior thereof and emptied upon being in communication with said housing aperture, said knob including detent-receiving indentations in a side face opposing said spring-receiving hole;

detent means disposed in contact with said spring so as to be biased against said knob face and to be removably forced into said indentations upon turning of said rotor; and means providing wiping action for levelling off said cavities upon being rotated.

2. Apparatus as defined in claim 1 wherein said rotor includes a plurality of spaced-apart, axially extending blades defining cavities therebetween.

3. Apparatus as defined in claim 2 wherein said means providing wiping action comprises a tubular segment of said side portions of said housing, said tubular segment being slightly spaced apart from edges of said blades upon rotation of the same.

4. Apparatus as defined in claim 3 wherein said tubular segment is arranged to enclose at least one pair of blades in slightly spaced-apart relation therefrom upon turning of the rotor so as to maintain the cavity between said blades in levelled-off condition.

5. Apparatus as defined in claim 1 wherein said housing is tapered inwardly at an end adjacent said knob to facilitate grasping of said knob.

6. Apparatus as defined in claim 1 including a tab mounted on the outside of said cap and extending perpendicularly downward when the cap is in operating position and supporting means providing a slot for engagement with said tab.

7. Apparatus as defined in claim 6 including a plurality of slots for engagement with tabs of a plurality of dispensing caps.

* * * * *